ALEXANDER KANN
INVENTOR
BY Victor J. Evans
ATTORNEY

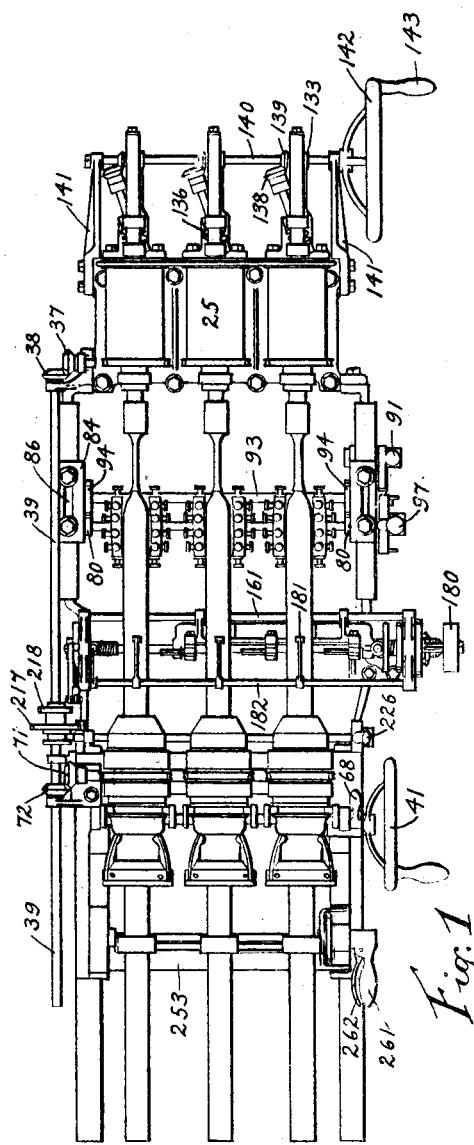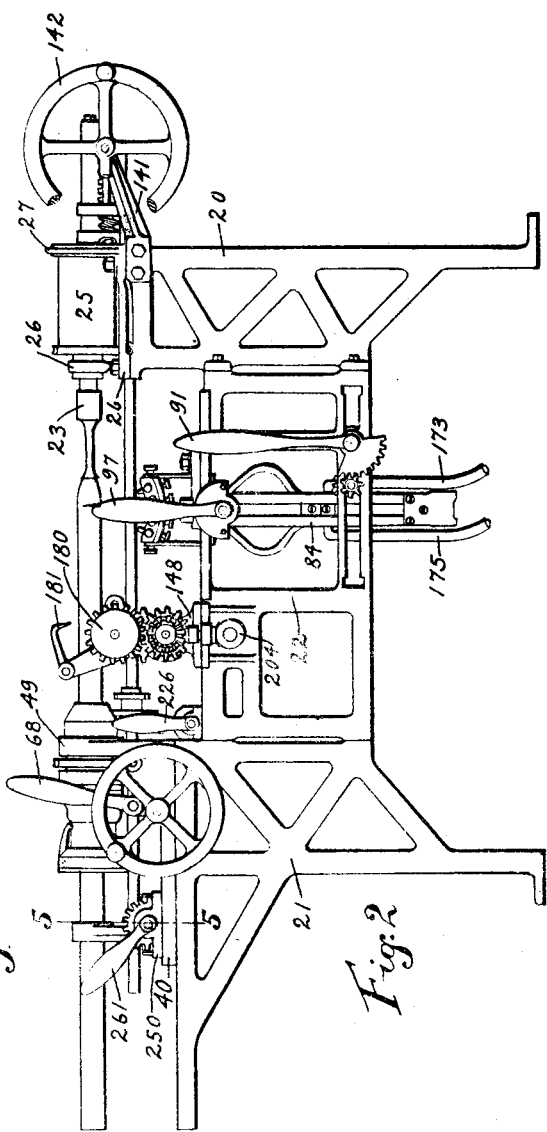

Oct. 14, 1924.  1,511,889
A. KANN
MULTIPLE GLASS BLOWING MACHINE
Filed Feb. 1921     5 Sheets-Sheet 3

ALEXANDER KANN.
INVENTOR
BY *Victor J. Evans*
ATTORNEY

Oct. 14, 1924.    1,511,889
A. KANN
MULTIPLE GLASS BLOWING MACHINE
Filed Feb. 1, 1921     5 Sheets-Sheet 4

ALEXANDER KANN
INVENTOR
BY Victor J. Evans
ATTORNEY

Filed Feb. 1 1921    5 Sheets-Sheet 5

ALEXANDER KANN
INVENTOR

BY *Victor J. Evans*
ATTORNEY

Patented Oct. 14, 1924.

1,511,889

UNITED STATES PATENT OFFICE.

ALEXANDER KANN, OF BROOKLYN, NEW YORK.

MULTIPLE GLASS-BLOWING MACHINE.

Application filed February 1, 1921. Serial No. 441,670.

*To all whom it may concern:*

Be it known that I, ALEXANDER KANN, a citizen of the Republic of Esthonia, residing at Brooklyn, in the county of Kings and State of New York, have invented new and useful Improvements in Multiple Glass-Blowing Machines, of which the following is a specification.

This invention relates to multiple glass blowing machines, and one of the principal objects is to provide a device of this nature whereby electric light bulbs, Christmas tree ornaments, and other like articles may be more readily, quickly, cheaply and conveniently blown.

Another object is to provide an improved mechanical blowing means.

Another object is to provide a novel heating means including an improved form of burner.

Another object is to provide novel cutting off means.

Another object is to provide novel advancing means for the tubing.

With these and other objects in view which will be more apparent as the specification proceeds, the invention resides in certain novel construction and combination and arrangement of parts, the essential features of which are hereinafter fully described, are particularly pointed out in the claims, and are shown in the accompanying drawings, in which:—

Figure 1 is a top plan view of my improved machine.

Figure 2 is a front elevational view of the same.

Figure 3:
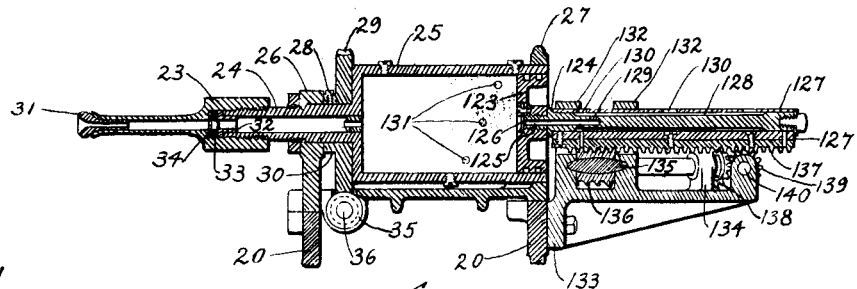
Figure 3 is a vertical sectional view of one of the head stocks.

This invention natural divides itself into eight sections, viz: (1) framework, (2) head stock, (3) tail stock, (4) heating mechanism, (5) blowing mechanism, (6) cut-off mechanism, and (7) accessories and (8) power drive; and these several divisions or sections will be described in the order named.

This invention also contemplates the simultaneous operation of a plurality of sets of these devices in the one machine; but, as the details of all of the sets are the same, one set only will be described, the others being understood to be duplicates thereof.

(*1*) *Framework.*—The framework of the machine may be of any desirable size and form so that it will properly support the working parts, but the preferred form comprises, head and tail trestles or supporting castings 20 and 21 and intermediate frame members 22 which support the heating and cutting off mechanism which will be later described.

(*2*) *Head stock.*—Broadly speaking the head stock comprises a chuck 23, a spindle 24, a blowing cylinder 25, and means for operating these various elements. A bracket 26 rises from the inner face of the trestle 20 and provides a bearing for spindle 24 which is formed integrally with or securely attached to one end of the cylinder 25, the said cylinder having its bearing in the upstanding portion 27 of bracket 26. Secured to the spindle 24 as by a set screw 28 is a worm gear 29 the purpose of which will be presently set forth and which has a collar 30. A nut or collar screws onto the spindle 24 on the opposite side of the bracket 26 from collar 30 and with said collar secures said spindle against longitudinal movement in its bearing in the bracket 26.

The chuck 23 screws onto the spindle and is provided at its mouth with a removable rest 31 which may be inserted in said mouth when small tubing is to be used. In the end of spindle 24 is inserted a bushing 32 next to which is placed a broad washer 33 of rubber or other resilient material and having a metal disk facing 34 at its outer side to bear against the end of the large bore of the chuck. It will thus be seen that when the glass tubing is projected through the washer 33 and the chuck 23 is screwed onto the spindle that the washer 33 being of resilient material will be forced into the space about the glass tubing and will clutch the tube so that it will be caused to turn with the chuck, spindle and cylinders 23, 24 and 25.

The principal function of the cylinder 25 is the blowing of the glass as will be hereinafter described fully.

The spindle 24 is rotated by the above mentioned worm gear 29 which is operated by a worm 35 mounted on a shaft 36 having bearings in the bracket member 26 and carrying at the rear of the machine a miter gear 37 operable by a meshing miter gear 38 mounted on the main operating shaft 39 of the machine.

(3) *Tail stock*.—The tail stock comprises means for rotating the tubing in synchronism with the head stock, means for clutching the tubing and moving it toward the head stock, and means for moving the entire tail stock on the base. To this end there is provided a slide member 40 which is adapted to move along the trestle 21 toward and away from the head stock. A hand wheel 41 is secured to the outer end of a stub shaft 42 having its bearing in the front of the slide 40 and carrying at its inner end a gear pinion 43 which meshes with a gear wheel 44 secured to a shaft 45 that extends from front to rear of the machine and has its bearings in the depending flanges 46 of slide member 40. At its ends, shaft 45 carries pinions 47 which mesh with respective rack bars 48 fastened to the base 21 of the machine. Upon turning the hand wheel 41 the slide 40 will therefore be moved along the base frame 21 toward or from the head stock.

Mounted in bearings 49 rising from the slide member 40 are the rotatable portions of the tail stocks. These comprise for each tail stock a rotatable tubular member 50 having keyed to it a worm gear 51 and threadedly secured to its inner end, a shell 52 which is provided with a tapered interior as shown in the drawings. A sleeve 53 is loosely mounted in the inner end of the tubular member, and is slotted at 54 so as to form a plurality of gripping fingers 55 which are provided with tapered ends 56 as shown. Pieces 57 of rubber or other resilient material are mounted in and project from said fingers 55. A second sleeve 58 is loosely mounted in the tubular member 50 and is provided at its outer end with an enlarged head 59. A cap 60 is screwed over the outer end of tubular member 50 and has pivotally mounted in it a plurality of rock levers 61 the horizontal arms of which extend over the tubular member 50. A clutch cone 62 is keyed to the member 50 and has its tapered portion adjacent to the free ends of the horizontal arms 63 of the rock levers 61. An annular groove 64 is formed in the periphery of the clutch member 62 and into this is projected a roller 65 mounted on the upper end of a rock arm 66 mounted on a shaft 67 supported in suitable bearings rising from the sliding member 40 and provided with a hand lever 68. Upon turning lever 68 clutch member 62 is moved so as to raise the horizontal fingers 63 of the levers 61 and thereby cause the vertical fingers thereof to press against the head 59 and move sleeves 58 and 53 inwardly until the rubber members 57 are forced into clutching engagement with the tubing, so as to effect turning of the tubing with the rotation of the tubular member 50. The worm gears 51 of the various tail stocks mesh with worms 69 on a cross shaft 70 provided at its rear end with a bevel gear 71 meshing with a bevel gear 72 on the main operating shaft 39, the construction and arrangement being such that both ends of the tubing will be turned at the same speed.

Figure 5:
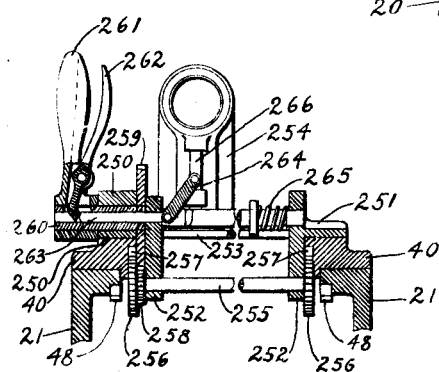
Figure 5 is a fragmentary vertical section in line 5—5 of Figure 2.
Figure 4:
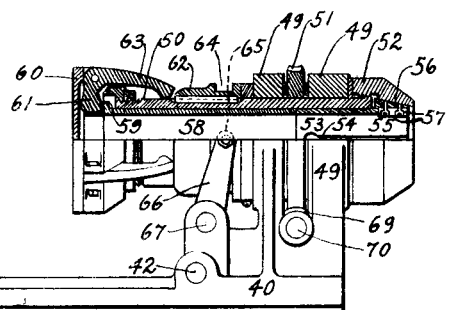
Figure 4 is a detail view partly in vertical section of one of the tail stocks.
Figure 6:
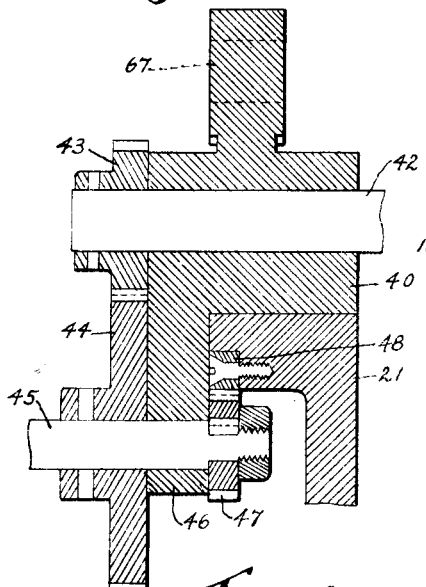
Figure 6 is a fragmentary enlarged view of the tail stock moving means.
Figures 7, 8:
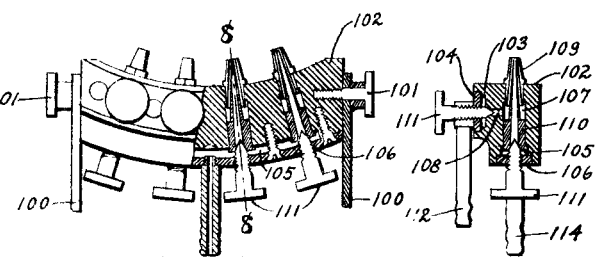
Figure 7 is a detail sectional view of one of the burners.
Figure 8 is a view on line 8—8 of Figure 7.
Figure 9:
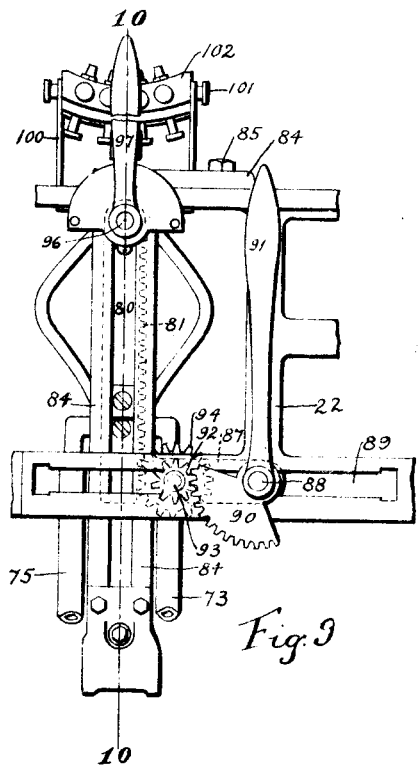
Figure 9 is a detail elevational view of the burner moving mechanism.
Figure 10:
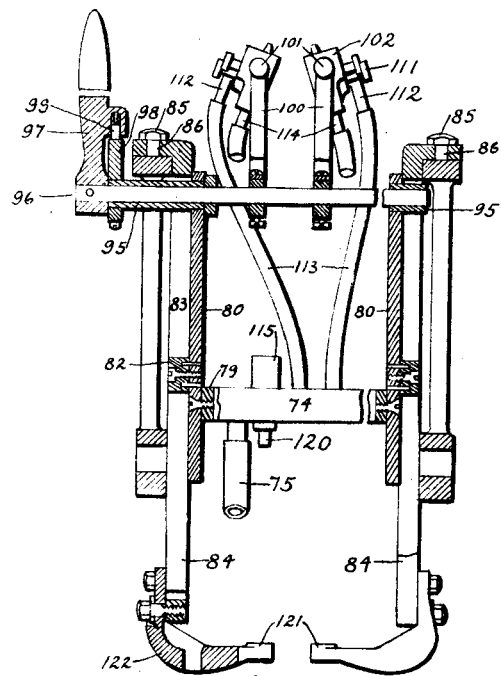
Figure 10 is a view on line 10—10 of Figure 9.
Figure 11:
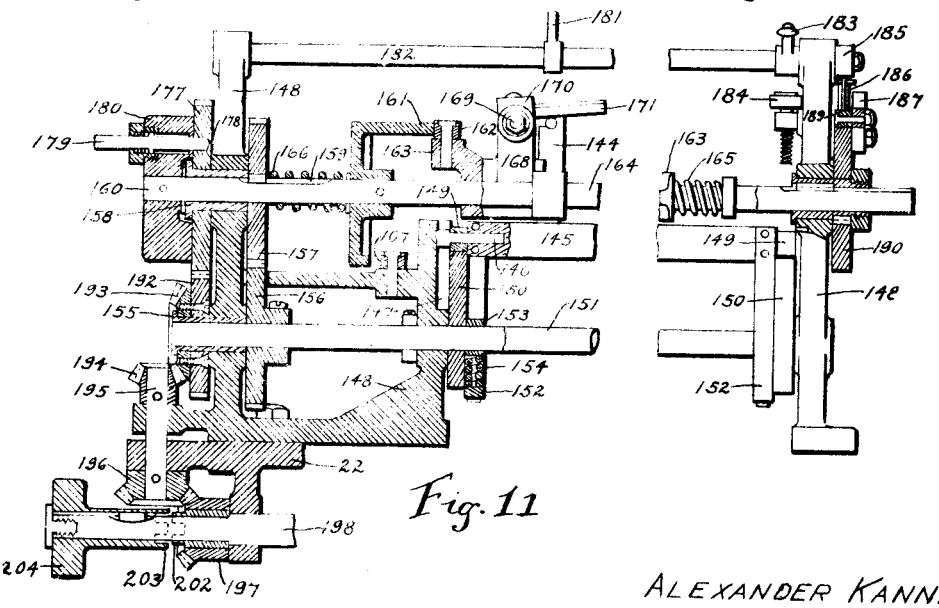
Figure 11 is a vertical sectional view of the cutting-off mechanism.
Figure 12:
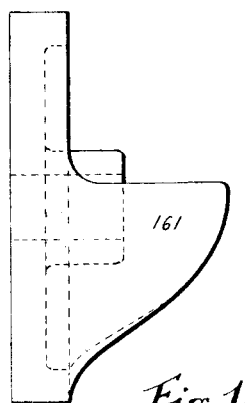
Figure 12 is a detail of the file operating cam.
Figure 13:
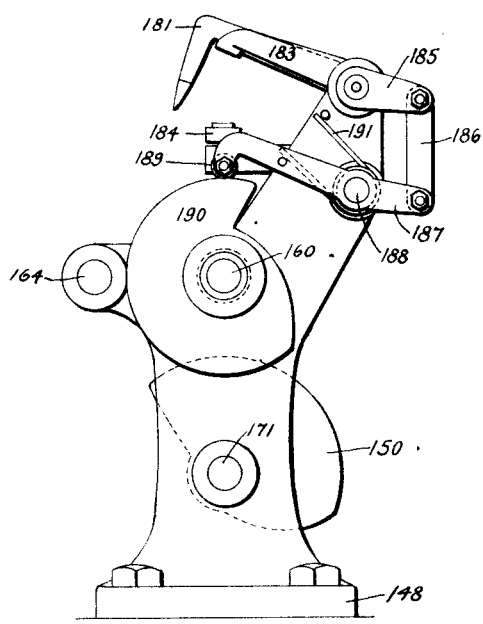
Figure 13 is a rear view of the cutting off mechanism.
Figure 14:
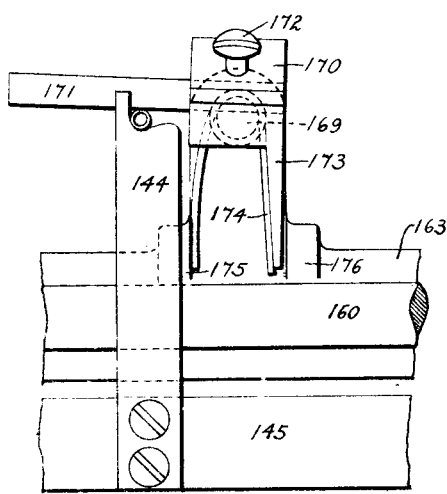
Figure 14 is a fragmentary detail view of one of the file holders and the rod holder associated therewith.
Figure 19:
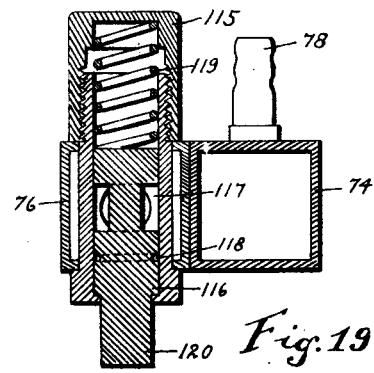
Figure 19 is a sectional view in line 19—19 of Figure 18.
Figure 18:
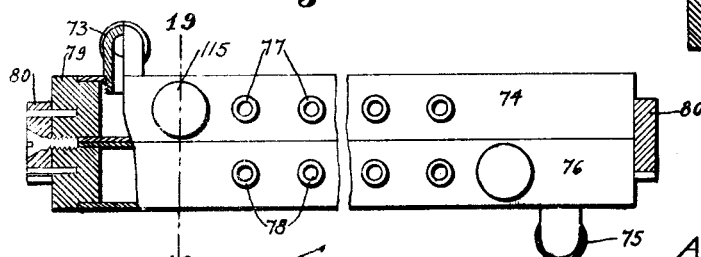
Figure 18 is a detail top view of the air and gas chests.
Figure 15:
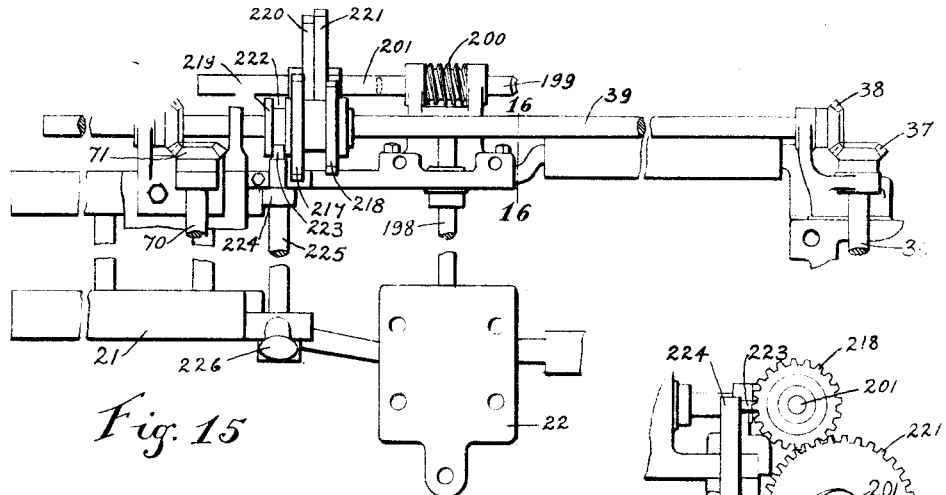
Figure 15 is a plan view of the operating mechanism.
Figure 16:
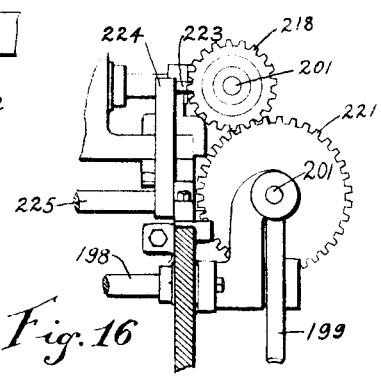
Figure 16 is a view on line 16—16 of Figure 15.
Figure 17:
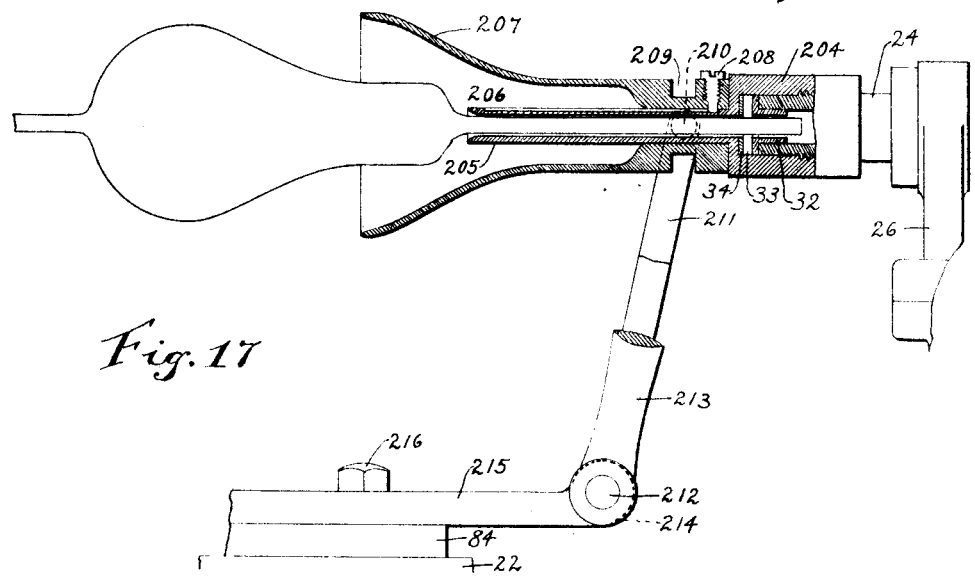
Figure 17 is a fragmentary view of the electric bulb blowing accessory.

Slidably mounted on the sliding members 40 is a cast frame (Figure 5) comprising a front bar 250, a rear bar 251, depending arms 252 and cross members 253. From the member 253 rises a rest 254 for the free end of each length of tubing. A cross shaft 255 is supported in arms 252 and has secured at its opposite ends gear wheels 256 which mesh with racks 257 supported under members 40. Secured in the rear of the front gear 256 is a pinion 258 also rotatable with shaft 255 and meshing with a master gear 259 which is fast on a sleeve 260 rotatably mounted in the member 250. A hand lever 261 is secured to the front end of sleeve 260 for rotating the same. A gripper lever 262 is pivoted to the rear side of handle 261 and has its lower end extended through a slot in the sleeve 260 so as to stand in front of a plunger 263 floating in the sleeve 260 and in holes in members 250 and 251, and having its rear end pivotally secured to a link 264 for each rest 254. A spring 265 tends constantly to force bar 263 forward against the end of lever 262. Each link 264 is pivotally connected with a vertically movable be lined with such resilient material. In operation, when the tubing is to be advanced, the operator grasps handles 261 and 262 drawing them together. This forces bar 263 rearward and by link 264 raises plunger 266 to grip the tube. The handles are then turned clockwise which rotates gear 259, pinion 258, and shaft 255 to rotate gears 256 which are thereby forced to "walk" along racks 257 thereby moving the frame 250, 251, 252, 253 and support 254 and the tubing to the right. Handle 262 is then released and handle 261 with connected parts are moved back to the left by hand.

*(4) The heating devices.*—The heating mechanism includes novel burners, mixers, and means for tilting and moving the burners in various directions.

A tube 73 of rubber or other flexible material is adapted to conduct gas into a square metal tube or chest 74 and a similar flexible tube 75 conducts air into a square tube or chest 76 lying against chest 74, both of the chests 74 and 76 extending completely across the machine from front to rear thereof intermediate the head and tail stocks and provided on their upper surfaces with pairs of nipples 77 and 78, one pair for each set of head and tail stocks. The ends of the metal chests 74 and 76 are closed by members 79 which are rigidly secured to vertically disposed slide members 80 which are each provided on one vertical edge with rack teeth 81 and on their outer faces are each provided with a squared slide block 82 riding in a vertical slot 83 in a member 84 which is secured to the intermediate main frame by bolts 85 passing through a slot 86 so that the members 84 together with the various parts supported thereby may be moved endwise of the machine when desired.

Rotatably secured in a laterally extending arm 87 of the front member 84 is a stub shaft 88 which extends through a lateral slot 89 in the front intermediate frame member 22. At its outer end, the stub shaft 88 carries a gear segment 90 and a hand lever 91. The gear segment 90 meshes with a pinion 92 mounted on the front end of a shaft 93 which projects through slot 89, extends completely across the machine and has its bearings in arm 87 and in a shorter similar arm formed on the rear member 84. Secured on the shaft 93 are two gears 94, one at each side of the machine and in mesh with a respective rack 81.

It will be readily seen that when the handle 91 is turned, the segment 90 will 96 to the front end of which rod is secured a hand lever 97. Mounted on the front tubular bearing 95 is a segment 98, and a plug 99 is supported in a boss on the inner surface of handle 97 and is spring driven into contact with the periphery of segment 98 so as to frictionally hold the lever 97 and shaft 96 in any adjusted position.

Mounted on the rod 96 is a plurality of pairs of U-shaped frames 100, one pair for each head and tail stock, and each having its legs extending upwardly and the legs of each frame carrying a burner between them. The burners are supported upon pivot pins or screws 101 so that the burner may be angularly adjusted in the frame 100. Each burner comprises a principal body member 102 in which is formed a way 103 for passage of the gas and closed by a cover 104, and a way 105 for passage of the air and closed by a cover 106. Holes 107 are bored from the air way 105 directly through the upper surface of member 102, and communicating holes 108 are drilled from the gas way 103 into the first holes 107. An outer nozzle 109 is inserted in the outer end of the holes 107 and extend in as far as the holes 108; and inner nozzles 110 are inserted at the inner ends of holes 107 and extend into nozzles 109 and nearly to the outlet thereof. It will thus be seen that the air and gas are kept separate until they are ready to be projected from the burners which has been found to prevent soot and smoking of the glass being operated upon. Adjusting screws 111 are seated in the covers 104 and 106 and control the amount of air and gas fed through any pair of nozzles. A nipple 112 passes through the cover 104 and is connected by a flexible tube 113 with one of the nipples 77 of the gas chest; and a nipple 114 passing through the cover 106 is connected with one of the nipples 78 of the air chest.

The gas and air are automatically closed down to a mere pilot flame when the burners are lowered out of operative condition. For this purpose, there is mounted in each chest vertically thereof and between the nipples connected to tubes 73 and 75, and any of the nipples 77 and 78, a frame 115 in which is slidably mounted an obstruction plunger 116 having large and small ways 117 and 118 for permitting a commensurate flow of gas or air through the respective chest. A spring 119 forces the plunger 116 down when the burners are elevated, so that the large way 117 is in register with the chest. When the handle 91 is operated, the burners and chests are lowered until the projection to a respective member 84; and the plunger is raised until its small way 118 is in register with the chest whereby the flow of gas and air is cut down to a "pilot."

(5) *Blowing mechanism.*—The cylinders 25 hereinbefore described form part of the blowing mechanism. Mounted in each cylinder 25 is a piston 123 which may be of any well known type and which may revolve with the cylinder. The piston rod 124 is bored centrally at its inner end as shown at 125 and provided with a check valve 126. The rod 124 is mounted for rotation in a sleeve 127 and is turned down at 128 between its ends and provided with a port 129 permitting communication between the turned down space 128 and the bore 125. Ports 130 are formed in sleeve 127 to permit free passage of air through into the turned down space. A number of screws 131 are seated in the cylinder and arranged spirally thereabout. By removing any one of these screws 131 the piston will not force air into the glass tubing for blowing the same until it has passed the open screw hole in the cylinder. It is obvious that in this way the charge of air forced out of the cylinder by the piston may be regulated; and that on the reverse movement of the piston the air will not be drawn back, as the check valve 126 will permit relief from the bore 125.

The sleeve 127 of the piston rod is secured in and supported by bearings 132 on a bracket 133 bolted to the main frame member 20. Mounted in bearings 134 supported by the bracket 133 is a rod or shaft 135 carrying near one a worm 136 which meshes with a rack 137 secured to the lower face of the bearing sleeve 127. The shaft 135 carries at its other end a bevel gear 138 which meshes with a bevel gear 139 on a shaft 140 having bearings in the brackets 133 and inside brackets 141. Shaft 140 has secured to its front end a wheel 142 adapted to be turned by a handle 143 for effecting the blowing operation.

(6) *Cut-off mechanism.*—The heat burns through the glass tubing and in so doing leaves the end of the portion in the tail stock closed so that it must be broken off before being advanced into the head stock so that the air from the cylinder may enter the tube to effect the next blowing operation. The mechanism for this purpose includes means for elevating rests under the tubes, means for drawing files across the tubes, hammer mechanism for breaking off the ends of the tubes, means for adjusting the throw of the hammers, and means for automatically rendering the cut-off mechanism inoperative at the end of each operation.

ends with pins 146 the heads of which are adapted to move smoothly in slots 147 in a bracket member 148 secured to the intermediate frame members 22. Mounted to rotate freely on each pin 146 is an anti-friction roller 149 which rests upon a respective cam disk 150. The cams 150 are mounted on and rotatable by a shaft 151; and slide frames 152 are secured to the supporting bar 145 and are arranged to enclose bearing blocks 153 freely mounted on shaft 151. Springs 154 tend constantly to depress the frames 152 and consequently the bar 145 and tube rests 144. It will thus be seen that upon rotation of the cams 150 the rests will be raised and lowered, movement being maintained in a vertical direction.

Shaft 151 has its bearings in the rear bracket member 148 and in a bushing 155 seated in the front bracket 148; and secured to said shaft is a gear wheel 156 which meshes with a gear wheel 157 keyed on a shaft 160, the key of said gear extending into a long key-way 159, in the shaft 160. Hence upon operation of this shaft 160, the rest raising shaft 151 will be rotated.

Mounted on shaft 160 is a cam member 161 the cam face of which is adapted to bear against a roller 162 mounted on a bracket 163 slidably secured on the shaft 160 and on a parallel shaft 164. A spring 165 tends constantly to move bracket 163 forwardly so as to keep roller 162 in contact with cam 161. Shaft 160 is also slidably mounted in its bearings and is constantly pressed rearwardly by a spring 166. The cam 161 is also adapted to bear against a roller 167 so as to shift the shaft 160 forwardly against the tension of spring 166. The bracket 163 is provided with an upwardly extending lug or finger 168 for each tail stock, and in each of these is secured a pivot pin 169 upon which is rotatably mounted a carrier 170 having a way formed in it in which is seated a file 171, held in place by a set screw 172; and also having a depending finger 173. A grasshopper spring 174 bears against a lug 175 on the bracket 163 and against the finger 173 tending constantly to force said finger against a lug 176 on the bracket 163. When the finger 173 is held against lug 176 the free end of file 171 is held high enough to pass over the tubing, but as the file is forced toward the rear of the machine under the action of cam 161, said file comes into contact with the tubing and is held yieldingly thereagainst by spring 174 so as to produce a "scratch" on the glass to determine the point of breakage by the hammer mechanism presently to be described.

Loosely mounted on the outer end of the bushing 158 is a gear wheel 177 having an cam 161 having ridden up onto roller 167 thereby moving shaft 160 forward until pin 179 has moved out of aperture 178. When it is desired to operate the cut-off mechanism, therefore, the operator grasps knob 180 and turns it clock-wise until the abrupt face of cam 161 rides over roller 167. Spring 166 then moves shaft 160 rearwardly until pin 179 rests against wheel 177 and when aperture 178 comes around, pin 179 drops in, and the mechanism is operable by the gear wheel 177 until the high part of cam 161 again engages roller 167 and automatically disconnects knob 180 and gear 177.

The hammers are shown at 181 there being one over each glass tube, and all are mounted on a shaft 182 which extends from front to rear of the machine and carries also a top arm 183 adapted to strike against the head of a screw 184 which may be adjusted vertically to vary the throw of the hammers. A rock arm 185 is secured at one end to shaft 182 and at its other to one end of a link 186 the other end of said link being pivoted to one end of a lever 187 pivotally mounted on a pin 188 secured to the rear bracket member 148, and carrying on its free end an anti-friction roller 189 which rides on the periphery of a cam 190. A spring 191 keeps the roller 189 in contact with cam 190. The cam 190 is mounted on and rotatable by the rod or shaft 160. As the cam 190 is rotated, lever 187 is rocked clock-wise and through link 186 and arm 185, shaft 182 is also rocked to raise the hammers 181 and then let them fall. When it is desired not to have the hammers operate, the screw 184 is raised so high as to hold up the stop arm 183 and to hold roller 189 off the cam 190.

The means for turning the gear wheel 177 is as follow: Meshing with said wheel 177 is a gear wheel 192 loosely mounted on the bushing or bearing sleeve 155. Secured to the gear 192 is a bevel gear 193 which meshes with a bevel gear 194 on the upper end of a short vertical shaft 195 having its bearings in the front bracket 148 and in the intermediate frame member 22. At its lower end, shaft 195 carries a bevel gear 196 that meshes with a bevel gear 197 loose on a constantly running shaft 198 extending from front to rear of the machine and carrying at its rear end a worm gear 199 meshing with a worm 200 which is mounted on a shaft 201 and may be operated from any suitable source of power in any well known and desirable manner. Gear 197 is provided with clutch teeth 202

(7) *Accessories.*—By removing the chuck 23 and substituting a chuck 204 therefor, the machine is ready for the blowing of electric light bulbs. The chuck 204 is provided at its inner end with a protrusion 205 provided with a key-way 206. A mold 207 is adapted to be secured to the protrusion 205 by screwing a key member 208 into the mold until the inner end projects into the key-way 206. The molds are provided with annular grooves 209 into which are projected rollers 210 carried on the free ends of arms 211 which may be secured on a shaft 212 carrying a handle 213. The shaft 212 is mounted to freely rotate in bearings 214 in the end of a member 215 which may be removably secured to the frame in any desired manner, as by a bolt 216. By operation of the handle 213 the mold may be moved to position for forming the bulb and then moved away so as to permit the completing and removal of the bulb.

(8) *Power drive.*—The main operating shaft 39 is preferably provided with a pair of driving gears 217 and 218 and a hub 219 all of which are secured together and keyed on the shaft 39 so as to slide therealong as a unit to three positions in one of which gear 217 meshes with a gear 220 on the aforementioned shaft 201; in another position the gear 218 meshes with a gear 221 on said shaft 201; and in an intermediate position, both gears 217 and 218 are out of mesh with gears 220 and 221. By making these various gears of different sizes, different speeds of operation may be attained. In order to shift the gears 217 and 218, the hub or collar 219 is provided with a peripheral groove 222 in which rides a finger 223 on the upper end of a connector 224 the lower end of which is secured to a shaft 225 extending through to the front of the machine and provided with a hand lever 226 which may be operated to effect the desired shifting of the gears.

As the operation of the various parts have been described in connection with the description of the various sections, no general description is deemed necessary.

While I have described what I deem to be the most desirable embodiment of my invention, it is obvious that many of the details of construction may be varied without in any way departing from the spirit of my invention, and I therefore do not limit myself to the exact details of construction herein set forth nor to anything less than the whole of my invention limited only by the appended claims.

plurality of glass tubes at their opposite ends, means for rotating said gripping means, heating means intermediate the ends of said tubes, and means associated with said gripping means for uniformly forcing the same amount of air into each of the tubes.

2. In a device of the class described, the combination of a plurality of gripping means each adapted to grip a glass tube at opposite ends, means common to all of said gripping means for rotating them, heating means intermediate the ends of said tubes, and means operable to uniformly force the same amount of air into each of said tubes.

3. In a device of the class described, the combination of a plurality of tail stocks each adapted to receive a glass tube, a plurality of chucks adapted to grip the end of a tube, means common to said tail stocks and chucks for effecting rotation of said tubes, heating means intermediate each of said tail stocks and said chucks, and means associated with said chucks for forcing uniform amounts of air into said tubes.

4. In a device of the class described, the combination of a tail stock having a rotatable member adapted to receive a length of glass tubing, a rotatable chuck for receiving the end of said tubing, means for rotating said rotatable member and said chuck, a burner arranged between said tail stock and chuck for heating said tubing, means for moving said burner with relation to said tubing, and means for regulating the admission of fuel to the burner through adjustments of the burner with relation to said tubing.

5. In a device of the class described, the combination of a tail stock adapted to receive a length of tubing, means mounted in said tail stock for gripping and rotating said tubing, means for moving said tail stock horizontally, means mounted on said tail stock for advancing said tubing, a chuck adapted to receive one end of said tubing and means associated with said chuck for forcing a predetermined amount of air into said tubing as and for the purpose described.

6. In a device of the class described, the combination of a tail stock comprising a rotary member adapted to receive a length of tubing, a chuck for receiving one end of said tubing means associated with said tail stock and chuck for rotating said tubing, a cylinder associated with said chuck and a plunger mounted on said cylinder and operable for forcing air into said tubing as and for the purpose set forth.

7. In a device of the class described, the combination of means for gripping and are rotatably mounted, a shaft upon which said brackets are mounted, manipulative means for moving said shaft vertically.

8. In a device of the class described, the combination of means for gripping and rotating a glass tube, means for heating said tube, means operable for forcing air into said tube, and automatic means for cutting off said tube and comprising a file movable across said tube, and a hammer adapted to be dropped against said tube.

9. In a device of the class described, the combination of means for gripping and rotating a glass tubing, means for heating said tubing, means for forcing air into said tubing, a file mounted to be drawn across said tubing, a hammer adapted to be brought into contact with said tubing, and a cam for operating said file and hammer.

10. In a device of the class described, the combination of means for gripping and rotating a glass tubing, means for heating said tubing, means for forcing air into said tubing, a file mounted to be drawn across said tubing, a hammer adapted to be brought into contact with said tubing, a cam for operating said file and hammer, and means adjustable to render said cam ineffective.

11. In a device of the class described, the combination of means for gripping and rotating a glass tube, means for heating said tube, a cylinder having a plurality of vent openings arranged between its ends and adapted to communicate with said tubing when gripped by said gripping means, and a plunger operable in said cylinder for forcing air therefrom into said tube.

12. In a device of the class described, the combination of a tail stock provided with means for gripping a length of glass tubing, a chuck for receiving the end of said tubing, a rest for said tubing mounted on said tail stock, a hand lever and means associated with said hand lever whereby said tubing may first be gripped in said rest and then moved therewith along said tail stock.

13. In a device of the class described, the combination of means for gripping and rotating a length of glass tubing, means for forcing air into said tubing, heating means for effecting heating of said tubing, means for moving said tubing, means for moving said heating means out of operative relation with said tubing, and means operable by movement of said heating means to its inactive position for effecting diminishing in the volume of fuel supplied to said heating means.

14. In a device of the class described, the combination of means for gripping and rotating a length of glass tubing, heating means for heating said tubing, means for blowing air into said tubing and a mold tion over the heated portion of said tubing for shaping said tubing upon operation of the air blowing means.

15. In a multiple glass blowing machine, a plurality of identical sets of revolving tube supporting mechanisms, means for heating the supported tube of each of said mechanisms, and blowing means operatively associated with each tube supporting mechanism for delivering a predetermined charge of air to the supported tube of such mechanism, said blowing means including a revolving cylinder, and a piston operating therein.

16. In a multiple glass blowing machine, a plurality of identical sets of revolving tube supporting mechanisms, means for heating the supported tube of each of said mechanisms, and blowing means operatively associated with each tube supporting mechanism for delivering a predetermined charge of air to the supported tube of such mechanism, said blowing means including a cylinder, a piston operating therein, and means for revolving the cylinder and the piston and for reciprocating the piston so as to blow air into the tube when the piston slides in one direction and for preventing the air from being drawn back into the cylinder when the piston slides in an opposite direction.

17. In a device of the class described, mechanism for gripping a plurality of glass ating the mechanism to simultaneously revolve all of the tubes, heating means intermediate the ends of each tube, and means associated with said gripping mechanism for uniformly blowing the same amount of air into each of said tubes.

18. A machine of the class described, comprising a revolving head-stock having means for gripping one end of a tube to be drawn and blown, a revolving tail-stock having means for clutching the opposite end of the tube and for moving the tube toward said head-stock, and a burner located between the said head and tail-stocks in heating relation to the tube, a blowing mechanism associated with said head-stock, and a mold in which the tube is free to revolve, said mold being slidable in the length of the tube.

19. In a machine of the character described, relatively movable revolving tube grippers including means for sliding a tube with respect to said grippers, and means for progressively heating the tube, means for drawing the same to form a bulb, means for blowing a fixed charge of air in the tube to be drawn, and means for cutting a portion of the tube in immediate proximity to one of said grippers.

In testimony whereof I have affixed my signature.

ALEXANDER KANN.